US012598408B2

(12) United States Patent
Ito

(10) Patent No.: US 12,598,408 B2
(45) Date of Patent: Apr. 7, 2026

(54) ACOUSTIC APPARATUS

(71) Applicant: ALPS ALPINE CO., LTD., Tokyo (JP)

(72) Inventor: Ryo Ito, Fukushima (JP)

(73) Assignee: ALPS ALPINE CO., LTD., Tokyo (JP)

( * ) Notice: Subject to any disclaimer, the term of this patent is extended or adjusted under 35 U.S.C. 154(b) by 123 days.

(21) Appl. No.: 18/628,207

(22) Filed: Apr. 5, 2024

(65) Prior Publication Data

US 2024/0348956 A1 Oct. 17, 2024

(30) Foreign Application Priority Data

Apr. 14, 2023 (JP) ................................ 2023-066506

(51) Int. Cl.
*H04R 1/34* (2006.01)
*H04R 1/02* (2006.01)
*H04R 1/40* (2006.01)

(52) U.S. Cl.
CPC ............ *H04R 1/025* (2013.01); *H04R 1/403* (2013.01); *H04R 2201/02* (2013.01)

(58) Field of Classification Search
CPC .. H04R 1/2815; H04R 1/2819; H04R 1/2823; H04R 1/2826; H04R 1/2846; H04R 1/2849; H04R 1/2857; H04R 1/2873; H04R 1/345; H04R 1/347; H04R 5/023; H04R 1/2888; B60N 2/879
See application file for complete search history.

(56) References Cited

U.S. PATENT DOCUMENTS 3,722,616 A * 3/1973 Beavers ................ H04R 1/347 381/387
3,777,844 A * 12/1973 Johnson .............. H04R 1/2811 181/199
4,490,842 A * 12/1984 Watanabe ............. B60N 2/803 381/86
5,313,525 A * 5/1994 Klasco ................ H04R 1/2834 381/350
(Continued)

FOREIGN PATENT DOCUMENTS

CN 212727399 U 3/2021
DE 202016004415 U1 * 9/2016 .......... H04R 1/2826
(Continued)

OTHER PUBLICATIONS

Extended European Search Report for 24168404.2 mailed on Sep. 30, 2024.
(Continued)

*Primary Examiner* — Ryan Robinson
(74) *Attorney, Agent, or Firm* — IPUSA, PLLC

(57) ABSTRACT

An acoustic apparatus includes at least two speakers, each of the speakers having a sound producing direction directed to a corresponding ear of left and right ears of a listener; and an enclosure covering a back portion of a corresponding speaker of the speakers. An opening to open the enclosure is provided at a position further away from the corresponding ear than the corresponding speaker of the speakers. An opening area of the opening is greater than or equal to an effective vibration area of each of the speakers.

5 Claims, 4 Drawing Sheets

(56) References Cited

U.S. PATENT DOCUMENTS

| | | | | |
|---|---|---|---|---|
| 6,665,412 | B1 * | 12/2003 | Mizoguchi | H04R 1/347 381/345 |
| 7,878,296 | B2 * | 2/2011 | Lee | H04R 1/347 181/155 |
| 8,457,324 | B2 * | 6/2013 | Tice | H04R 1/323 381/71.7 |
| 10,950,217 | B1 * | 3/2021 | Dong | G02B 27/0176 |
| 2004/0264727 | A1 | 12/2004 | Kim | |
| 2010/0202619 | A1 * | 8/2010 | Vincenot | G10K 11/346 381/17 |
| 2015/0181322 | A1 | 6/2015 | Huang | |
| 2016/0323664 | A1 | 11/2016 | Kirsch | |
| 2020/0398722 | A1 * | 12/2020 | Soltner | H04R 5/023 |
| 2022/0108678 | A1 * | 4/2022 | Festag | G10K 11/175 |
| 2024/0048882 | A1 * | 2/2024 | Wang | H04R 5/023 |
| 2024/0236555 | A1 * | 7/2024 | Zhang | H04R 1/1075 |
| 2024/0323578 | A1 * | 9/2024 | Qi | H04R 1/1016 |
| 2024/0414474 | A1 * | 12/2024 | Corynen | H04R 1/345 |
| 2025/0008254 | A1 * | 1/2025 | Chiba | H04R 1/345 |
| 2025/0020946 | A1 * | 1/2025 | Guo | G10K 11/178 |
| 2025/0168557 | A1 * | 5/2025 | Kako | G10K 11/17827 |

FOREIGN PATENT DOCUMENTS

| | | | | |
|---|---|---|---|---|
| EP | 4465657 A1 * | 11/2024 | | H04R 1/347 |
| JP | S61199275 U * | 12/1986 | | |
| JP | H0620465 Y2 * | 6/1994 | | B60N 2/879 |
| JP | 2009-260525 | 11/2009 | | |
| JP | 2020-203673 | 12/2020 | | |
| WO | 2021/249843 | 12/2021 | | |

OTHER PUBLICATIONS

Kleiner Mendel : “Figure 24.12 an example of a modern electrodynamic headphone using a bass-reflex system” In : “Electroacoustics”, Feb. 26, 2013, CRC Press Tayler & Francis Group, XP093205362, ISBN: 978-1-4665-9943-7 p. 460.

* cited by examiner

ACOUSTIC APPARATUS

CROSS-REFERENCE TO RELATED APPLICATIONS

The present application is based on and claims priority to Japanese Patent Application No. 2023-066506, filed on Apr. 14, 2023, the entire contents of which are incorporated herein by reference.

BACKGROUND OF THE INVENTION

1. Field of the Invention

The present invention relates to an acoustic apparatus that applies sound pressure to a listener seated on a seat of, for example, an automobile.

2. Description of the Related Art

Patent Document 1 describes an invention relating to a headrest of a vehicle seat in which a speaker device is incorporated. In the speaker device illustrated in FIGS. 4 and 5, a speaker is provided in each of cavities formed in both side arms of a housing. The housing is provided with a passage communicating with each cavity and extending backward, and an outlet for opening each passage. Paragraph 0025 states that at each passage and outlet, the Helmholtz resonator principle can be implemented to produce sound at a higher volume at a frequency lower than the cutoff frequency of the speaker.

Patent Document 2 also describes an invention relating to a speaker device incorporated into a headrest. In this speaker device, speakers are housed in the left and right sides of the headrest. The speakers are arranged in a place close to the user's ears. The speakers include a speaker unit for a woofer and a speaker unit for a tweeter. FIGS. 4 to 7 illustrate a speaker box for housing the speaker unit for the woofer. The speaker box includes a rear wall, a side wall and a front wall. As illustrated in FIG. 8, a plurality of openings are formed in the side wall of the speaker box along the entire circumference. Each opening has a slender shape with a width of approximately 2 mm to 4 mm. Paragraph 0015 states that the sound output to the front of the speaker box and the sound output from the side wall opening cancel each other, thereby preventing a portion of the sound generated from the headrest from being transmitted to the side or rear, and preventing sound leakage to the surroundings of the speaker.

RELATED-ART DOCUMENTS

Patent Documents

[Patent Document 1] Japanese Laid-Open Patent Publication No. 2020-203673

[Patent Document 2] Japanese Laid-Open Patent Publication No. 2009-260525

The speaker device described in Patent Document 1 can deliver a sound emphasizing a low tone to a listener seated on a vehicle seat provided with the speaker device by the Helmholtz resonance tube principle with a passage and an opening located at the rear of the speaker. However, the low frequency sound pressure is easily leaked from the speaker device to the surroundings, and the sound pressure of the low tone can be reached to the occupant seated on a seat next to or behind the seat with the speaker device. Therefore, it is not suitable for a system that performs individual source reproduction for each seat, and to realize individual source reproduction for each seat, special software for canceling crosstalk is required, and a very expensive system must be constructed.

The speaker device described in Patent Document 2 attempts to cancel the sound emitted from the speaker by the sound output from the opening formed in the side wall of the speaker box housing the speaker unit for the woofer, but because the opening is small in width of approximately 2 mm to 4 mm, it is not possible to sufficiently cancel the low frequency sound from the woofer, and it is difficult to sufficiently prevent the low frequency sound from circulating from the headrest and spreading to the surroundings.

SUMMARY OF THE INVENTION

It is a general object of the described embodiments to provide an acoustic apparatus which can provide sound pressure to a seated listener and which can enhance the effect of preventing sound leakage to the surroundings of the sound pressure in a relatively low frequency band.

According to an embodiment, there is provided an acoustic apparatus including

- at least two speakers, each of the speakers having a sound producing direction directed to a corresponding ear of left and right ears of a listener; and
- an enclosure covering a back portion of a corresponding speaker of the speakers, wherein an opening to open the enclosure is provided at a position further away from the corresponding ear than the corresponding speaker of the speakers, and an opening area of the opening is greater than or equal to an effective vibration area of each of the speakers.

According to an embodiment, there is provided an acoustic apparatus including

- at least two speakers, each of the speakers having a sound producing direction directed to a corresponding ear of left and right ears of a listener; and
- an enclosure covering a back portion of a corresponding speaker of the speakers, wherein an opening to open the enclosure is provided at a position further away from the corresponding ear than the corresponding speaker of the speakers, and an opening/closing member configured to close the opening is provided.

BRIEF DESCRIPTION OF THE DRAWINGS

Other objects and further features of the present invention will be apparent from the following detailed description when read in conjunction with the accompanying drawings, in which.

DESCRIPTION OF THE EMBODIMENTS

The present invention relates to an acoustic apparatus including at least two speakers having a sound producing direction directed to each of left and right ears of a listener; and an enclosure covering a back portion of each of the speakers, wherein an opening to open the enclosure is provided at a position further away from the ear than each of the speakers, and an opening area of the opening is greater than or equal to an effective vibration area of each of the speakers.

The present invention also relates to an acoustic apparatus including at least two speakers having a sound producing direction directed to each of left and right ears of a listener; and an enclosure covering a back portion of each of the speakers, wherein an opening to open the enclosure is provided at a position further away from the ear than each of the speakers, and an opening/closing member configured to close the opening is provided.

In the acoustic apparatus of the present invention, when a direction in which a face of the listener is directed is a front direction, each opening is preferably at a position further toward the front direction relative to the speaker.

The acoustic apparatus according to an embodiment of the present invention can be configured such that a path reference port having a smaller opening area than the opening is provided.

The acoustic apparatus according to an embodiment of the present invention can be configured such that an opening/closing member configured to close the opening is provided.

In the first acoustic apparatus according to an embodiment of the present invention, the distance from the speaker to the ear is short, and, therefore, the sound pressure of the middle and high ranges easily reaches the ear. Further, the sound pressure in the relatively low range output from the speaker is canceled by the sound pressure in the inverted phase output from the opening with an opening area larger than the effective vibration area of the speaker, and, therefore, it is easy to prevent sound leakage to the surroundings and other seats. In the second sound apparatus according to an embodiment of the second invention, an opening/closing member capable of closing the opening is provided, and, therefore, when there is no concern about sound leakage to the surroundings, the opening is closed to reduce the cancellation effect by the opening so that higher quality sound can be heard.

Further, when the opening is positioned further in a front direction relative to the speaker, the listener positions the head as far back as possible because the volume to be heard decreases due to the cancellation effect by the opening when the head is moved forward. As a result, the listener sitting on the seat of the vehicle maintains the position in which the head is in contact with the headrest, which makes it easier to ensure safety while driving. It is especially easy to ensure safety when the listener is an infant.

Figure 1:
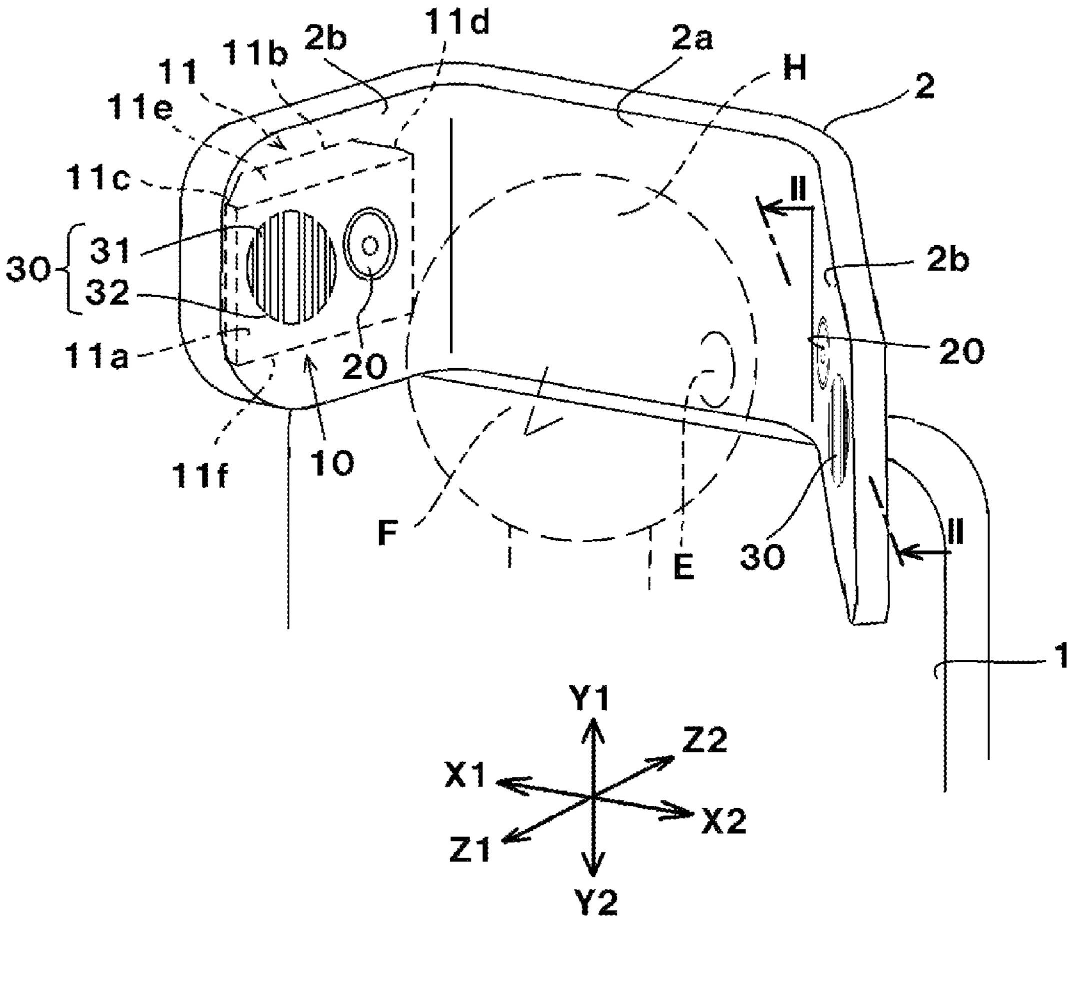
FIG. 1 is a perspective view of the listener's head and the acoustic apparatus of the first embodiment of the present invention from an oblique front view.

FIG. 1 illustrates a seat back 1 constituting a part of a seat provided in the interior of an automobile and a headrest 2 installed on the seat back 1. An acoustic apparatus 10 according to the first embodiment of the present invention is installed in two places inside the headrest 2. The acoustic apparatus of the present invention may be installed in a headrest of a seat equipped in a vehicle such as a train other than an automobile, or may be installed in a headrest of a seat equipped in a home, a theater, etc.

Figure 2:
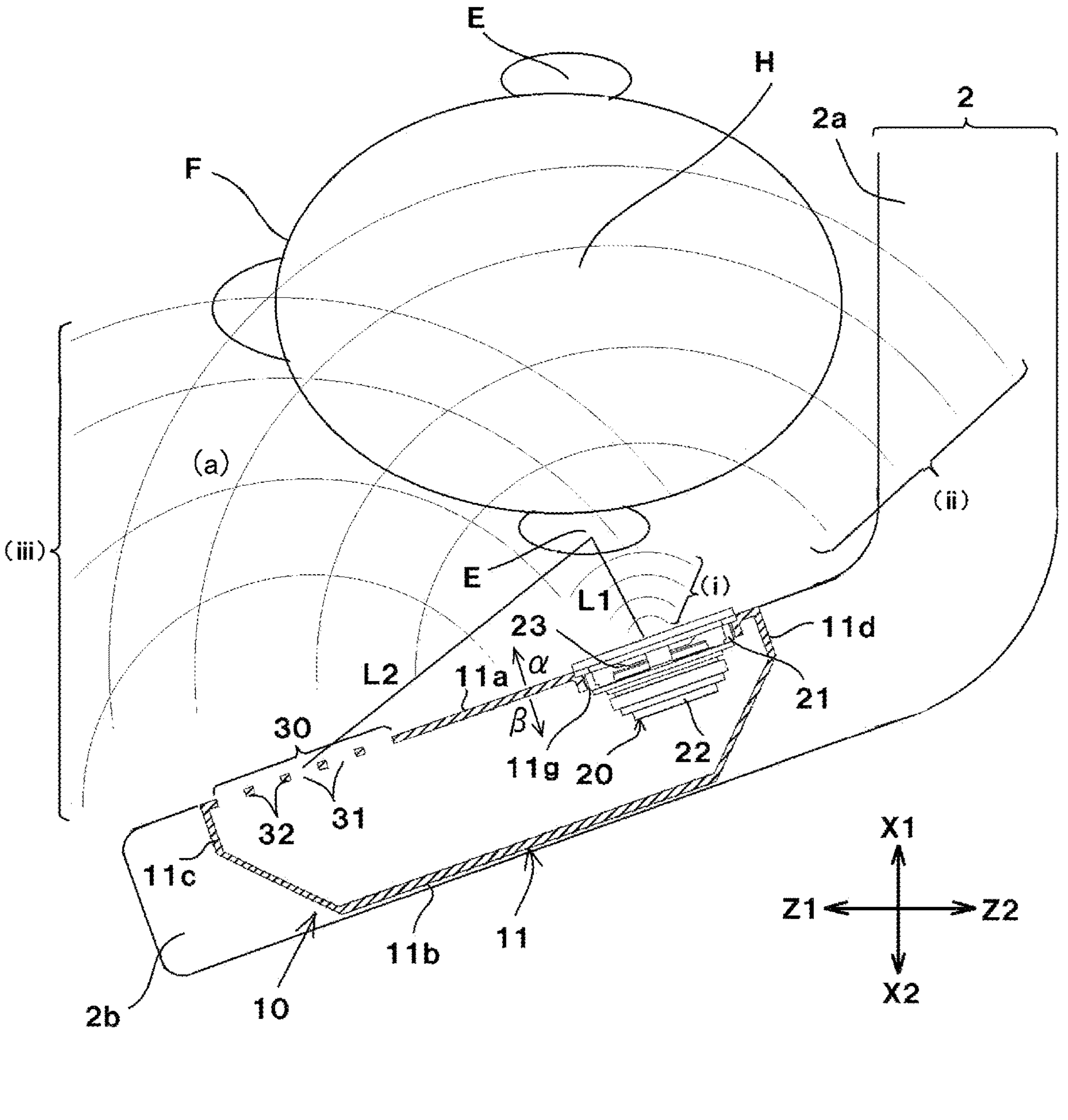
FIG. 2 is a partial planar cross-sectional view of the acoustic apparatus of the first embodiment cut at line II-II illustrated in FIG. 1.

FIGS. 1 and 2 illustrate the head H of a listener who is an occupant of an automobile. In the acoustic apparatus 10, the Z1-Z2 direction is the front-rear direction, the Z1 direction is toward the front, and the Z2 direction is toward the rear. The front direction (Z1 direction) is the direction in which the face F, which is a part of the head H of the listener, faces. The X1-X2 direction is the lateral direction, and the direction in which the left and right ears E and E of the listener are aligned is the lateral direction. The X1 direction is the left direction, and the X2 direction is the right direction. The Y1-Y2 direction is the vertical direction, the Y1 direction is the upward direction, and the Y2 direction is the downward direction. The Y1-Y2 direction is perpendicular to both the front-rear direction (Z1-Z2 direction) and the lateral direction (X1-X2 direction).

Each acoustic apparatus 10 has an enclosure 11. As illustrated in FIG. 1, the enclosure 11 has a sound producing sidewall 11*a*, a back sidewall 11*b*, a front sidewall 11*c*, and a rear sidewall 11*d*, and further has an upper sidewall 11*e* and a lower sidewall 11*f*. The sound producing sidewall 11*a* extends parallel and perpendicular to the vertical direction (Y1-Y2 direction). The back sidewall 11*b* is parallel to the sound producing sidewall 11*a*. The front sidewall 11*c* and the rear sidewall 11*d* face each other in the front-rear direction, and the upper sidewall 11*e* and the lower sidewall 11*f* face each other in the vertical direction. The enclosure 11 forms an acoustic space surrounded by the sound producing sidewall 11*a* and the back sidewall 11*b*, the front sidewall 11*c* and the rear sidewall 11*d*, and the upper sidewall 11*e* and the lower sidewall 11*f*.

In the headrest 2, a head receiving portion 2*a* located at the rear is integrated with side facing portions 2*b* extending diagonally forward from both the right and left sides of the head receiving portion 2*a*. The two side facing portions 2*b* and 2*b* are inclined so as to open from each other in the left and right directions as the position is further toward the forward direction (in the Z1 direction). The enclosure 11 constituting the acoustic apparatus 10 is housed in the respective side facing portions 2*b*. As illustrated in FIG. 2, the sound producing sidewall 11*a* of the enclosure 11 appears on the surface of the side facing portion 2*b*, and the sound producing sidewall 11*a* is also inclined in the front-rear direction (Z1-Z2 direction). The angle θ at which the sound producing sidewall 11*a* is inclined with respect to the front-rear direction is 0 degrees or more but less than 90 degrees. Preferably, the angle θ is 0 degrees or more but less than or equal to 60 degrees, and more preferably, the angle θ is 0 degrees or more but less than or equal to 30 degrees.

A holding hole 11*g* is formed in the sound producing sidewall 11*a* of the enclosure 11, and a speaker 20 is held in the holding hole 11*g*. The α direction illustrated in FIG. 2 is the sound producing direction of the speaker 20, and the β direction is the back direction. The enclosure 11 forms an acoustic space covering the speaker 20 from the back. As illustrated in FIG. 2, the speaker 20 has a frame 21 secured to the holding hole 11*g*. The frame 21 supports a magnetic circuit 22 and a diaphragm 23. The center of the diaphragm 23 is supported by the frame 21 through a damper, and the outer periphery of the diaphragm 23 is supported by the frame 21 through an edge member. The damper and the edge member enable the diaphragm 23 to vibrate toward the sound producing direction α. The diaphragm 23 is provided with a bobbin and a voice coil wound on the bobbin, and the voice coil is located in a magnetic gap formed in the magnetic circuit 22. When a voice current flows through the voice coil, the diaphragm 23 vibrates by an electromagnetic force acting on the voice coil, and a sound pressure is generated. A sound pressure to be heard is provided toward the sound producing direction α, and a sound pressure whose phase is opposite to the sound producing direction α is provided to the back direction β. The effective vibration area of the speaker is the area of the projection image obtained by projecting the diaphragm 23 and the edge member connected to the outer periphery of the diaphragm 23 onto a plane orthogonal to the α-β direction.

An opening 30 is formed in front of the holding hole 11*g* on the sound producing sidewall 11*a* of the enclosure 11. As illustrated in FIG. 1, the opening 30 occupies a circular area, and a plurality of ribs 32 are formed in this area to separate slits 31 and 31, which are elongated in the vertical direction (Y1-Y2 direction). The total area of the slits located in the opening 30 is the opening area of the opening 30. The opening area of the opening 30 is the same as or larger than the effective vibration area of the speaker 20.

The openings herein may be an assembly of a plurality of small holes. The area in which the slits and small holes are formed is not limited to a circle, but may be an oblong or a square. For the opening, it is necessary that the sum of the areas of the slits and holes is greater than or equal to the sum of the areas of the parts in which the slits and small holes are not formed (such as the ribs 32). Further, the opening may be a large hole in which the entire circular or rectangular area is open.

As illustrated in FIG. 2, when L1 is the distance from the center of the effective vibration area of the speaker 20 to the listener's ear E, and L2 is the distance from the center (centroid) of the area of the opening 30 to the listener's ear E, L2 is longer than L1, and L2 is greater than or equal to twice the length of L1. In the speaker 20, the sound producing direction α is directed to the ear E. The opening 30 is positioned further toward the front relative to the ear E. The speaker 20 and the opening 30 are provided on the same sound producing sidewall 11*a* of the enclosure 11, and the sound producing sidewall 11*a* has an opening angle θ with respect to the front-rear direction (Z1-Z2 direction). Therefore, the speaker 20 is positioned near the ear E, and the opening 30 is positioned further toward the front relative to the ear E and far from the ear E.

Next, the operation of the acoustic apparatus 10 will be described.

As illustrated in FIG. 1, the pair of acoustic apparatuses 10 are provided in respective side facing portions 2*b* of the headrest 2, the acoustic apparatuses 10 face each of the left and right ears E, and sound pressure is applied to the respective ears E from the two acoustic apparatuses 10. FIG. 2 schematically illustrates a propagation state of sound pressure applied from the left acoustic apparatus 10 to the left ear E. The sound pressure applied from the speaker 20 in the sound producing direction α and the sound pressure applied from the speaker 20 in the back direction ß are opposite in movement, and, therefore, the sound pressure applied directly from the speaker 20 to the ear E and the sound pressure applied diagonally forward from the opening 30 are in opposite phase.

Among the sound pressure output from the speaker 20 in the sound producing direction α, the sound pressure (i) in the middle and high ranges has excellent straightness, and because the distance from the speaker 20 to the ear E is short, the sound in the middle and high ranges can be clearly heard with sufficient volume by the ear. The sound pressure (ii) in the low frequencies output from the speaker 20 in the sound producing direction α extends over a wide range due to the long wavelength, and this sound pressure (ii) is canceled by the sound pressure (iii) in the opposite phase output from the opening 30. The opening area of the opening 30 is larger than the vibration effective area of the speaker 20, and, therefore, the sound pressure (iii) in the opposite phase extends over a wide range, and the sound pressure in the low frequencies emitted from the speaker 20 is canceled effectively.

In the acoustic apparatus 10 of the embodiment, the following effects can be expected.

(1) The opening area of the opening 30 is larger than the effective vibration area of the speaker 20 and the opening 30 is located far from the ear E toward the front, and, therefore, the cancellation by the opening 30 is applied more effectively at a location further toward the front relative to the ear E. The listener can clearly hear the sound pressure from the speaker 20 when the head H is moved backward and in close contact with the head receiving portion 2*a*, but when the head H is moved forward (in the Z1 direction) away from the head receiving portion 2*a*, the ear E is moved away from the speaker 20, and the sound pressure (i) in the middle and high ranges becomes difficult to reach the ear E, and the cancellation effect of the sound pressure (iii) in the opposite phase from the opening 30 reduces the volume reaching the ear E. Therefore, the listener maintains a posture in which the head H is in close contact with the head receiving portion 2*a*. Thus, when the acoustic apparatus 10 is installed on the seat of the vehicle, it becomes easy to ensure the safety of the occupant. Especially, when the listener is an infant, it is easy to ensure the safety during driving by preventing the head H from floating from the headrest 2. The sound pressure of the middle and high ranges is excellent in straightness and the distance from the speaker 20 to the ear E is short, and, therefore, it is possible to clearly hear the sound of the middle and high ranges for the infant with the ear E. Further, in the case of an adult listener, when the head H is placed in a position close to the headrest 2, it is possible to surely hear the guidance voice sound of car navigation in the high frequency range and various warning sounds.

(2) The opening 30 has a large opening area and is located further toward the front relative to the speaker 20, and, therefore, the sound pressure from the speaker 20 is effectively canceled at the front. Thus, as indicated by (a) in FIG. 2, the sound pressure (ii) in the low range that diffracts to the front or the upper part of the headrest 2 and spreads, can be effectively canceled by the sound pressure (iii) in the opposite phase from the opening 30. Therefore, it is easy to prevent the sound from leaking to the surroundings away from the headrest 2, and it is easy to prevent the sound in the low range from leaking to passengers in other seats when they are individually listening to music using the same acoustic apparatus in other seats.

Figure 3:
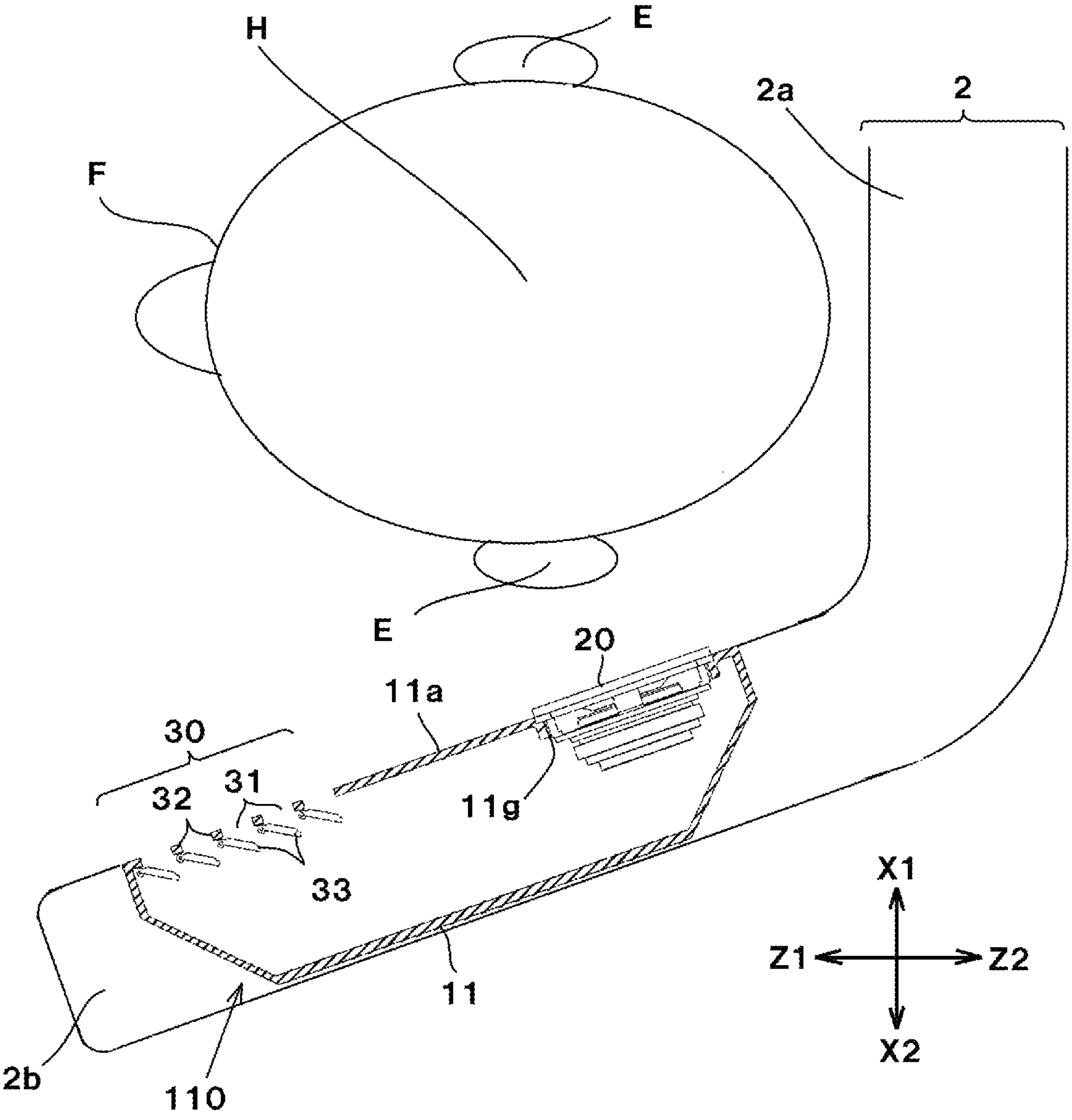
FIG. 3 is a partial planar cross-sectional view of the acoustic apparatus of the second embodiment of the present invention.

FIG. 3 illustrates the acoustic apparatus 110 according to the second embodiment of the present invention. An acoustic apparatus 110 is provided with an opening/closing member 33 for opening/closing the slit 31 of the opening 30, that is, for closing/opening the opening 30. The opening/closing member 33 can be operated manually or electrically. The acoustic apparatus 110 has the same configuration as the acoustic apparatus 10 of the first embodiment except for the opening/closing member 33. When the acoustic apparatus 110 is used, and a passenger is seated in another seat and it is desired to reduce sound leakage to the passenger in the other seat, the sound is reproduced with the opening 30 open. When it is not necessary to prevent the sound leakage to the surroundings, such as when the passenger is in the vehicle alone, the opening/closing member 33 is operated to close the opening 30. As a result, the sound from the speaker 20 can be heard without being canceled by the sound pressure from the opening 30.

Figure 4:
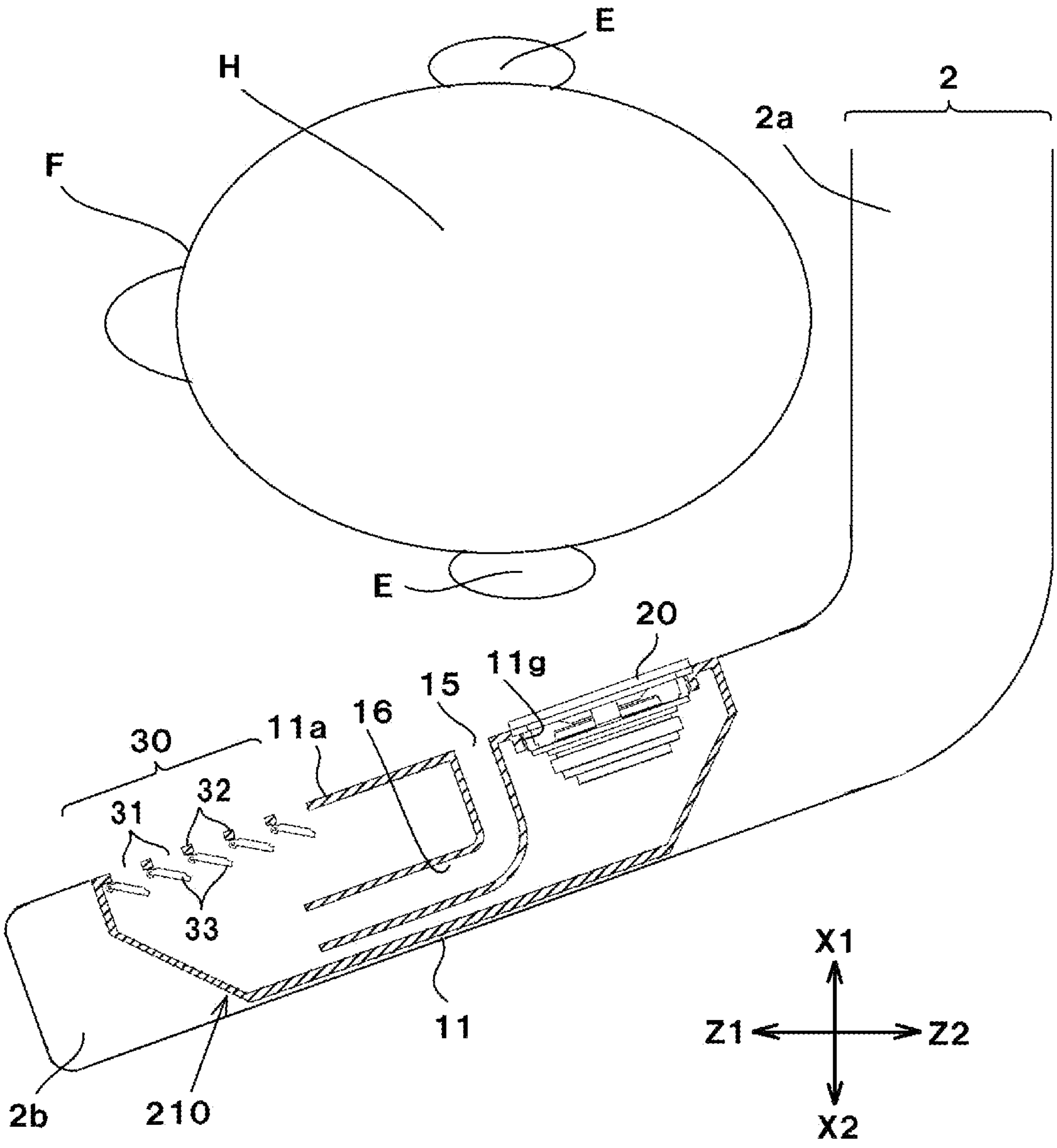
FIG. 4 is a partial planar cross-sectional view of the acoustic apparatus of the third embodiment of the present invention.

FIG. 4 illustrates an acoustic apparatus 210 according to a third embodiment of the present invention. The acoustic apparatus 210 is provided with the opening/closing member 33 for closing and opening the opening 30 in the same manner as the acoustic apparatus 110 according to the second embodiment. A bass reflex port 15 is opened in the sound producing sidewall 11*a* of the enclosure 11. A resonance tube 16 extending into the enclosure 11 is integrated with the bass reflex port 15. The bass reflex port 15 is located between the speaker 20 and the opening 30. The opening area of the bass reflex port 15 is smaller than the opening area of the opening 30 and smaller than the vibration effective area of the speaker 20.

When the acoustic apparatus 210 is used, and it is necessary to prevent the sound leakage of the low range band to the surroundings, the opening/closing member 33 is operated to open the opening 30. The operation at this time is the same as that of the acoustic apparatus 10 and 110, and the sound pressure of the low range band mainly from the speaker 20 can be canceled by the sound pressure of the opposite phase output from the opening 30. When the opening 30 is opened, the inner space of the enclosure 11 communicates with the outside air through the opening 30, and, therefore, the Helmholtz resonance effect is not appreciably exerted even when the bass reflex port 15 is provided. When there is no need to care about sound leakage to the surroundings, such as when a passenger is not seated in another seat, the opening/closing member 33 is operated to close the opening 30. At this time, the internal space of the enclosure 11 is substantially sealed, and the Helmholtz resonance effect can be exerted by the presence of the bass reflex port 15, so that sound in which the low sound is emphasized can be provided to the ear E.

In each of the embodiments, one speaker 20 is installed in each of the enclosures 11, but another speaker, such as a tweeter, may be installed in the enclosure 11 together with the speaker 20.

What is claimed is:

1. An acoustic apparatus comprising:

at least two speakers, each of the speakers having a sound producing direction directed to a corresponding ear of left and right ears of a listener; and an enclosure covering a back portion of a corresponding speaker of the speakers, wherein an opening to open the enclosure is provided at a position further away from the corresponding ear than the corresponding speaker of the speakers, and an opening area of the opening is greater than or equal to an effective vibration area of each of the speakers.

2. The acoustic apparatus according to claim 1, wherein when a direction in which a face of the listener is directed is a front direction, each opening is at a position further toward the front direction relative to the speaker.

3. The acoustic apparatus according to claim 1, further comprising:

an opening/closing member configured to close the opening.

4. The acoustic apparatus according to claim 3, further comprising:

a bass reflex port having a smaller opening area than the opening area of the opening.

5. The acoustic apparatus according to claim 4, wherein the bass reflex port is provided between the speaker and the opening.

* * * * *